United States Patent
Yoo et al.

(10) Patent No.: US 9,711,772 B2
(45) Date of Patent: Jul. 18, 2017

(54) POROUS SEPARATOR WITH WATER-BASED ORGANIC/INORGANIC COMPLEX COATING, A METHOD FOR PREPARING THE SAME, AND AN ELECTROCHEMICAL DEVICE USING THE SAME

(71) Applicant: SAMSUNG TOTAL PETROCHEMICALS CO., LTD., Seosan-si (KR)

(72) Inventors: Ji Na Yoo, Incheon (KR); Jae Yong Hyun, Dangjin-gun (KR); Do Hoon Lee, Seosan-si (KR); Chang Hyun Choi, Seoul (KR)

(73) Assignee: HANWHA TOTAL PETROCHEMICAL CO., LTD., Seosan-si (KR)

( * ) Notice: Subject to any disclaimer, the term of this patent is extended or adjusted under 35 U.S.C. 154(b) by 221 days.

(21) Appl. No.: 14/396,028

(22) PCT Filed: Nov. 1, 2013

(86) PCT No.: PCT/KR2013/009824
§ 371 (c)(1),
(2) Date: Oct. 21, 2014

(87) PCT Pub. No.: WO2014/092334
PCT Pub. Date: Jun. 19, 2014

(65) Prior Publication Data
US 2015/0140404 A1    May 21, 2015

(30) Foreign Application Priority Data
Dec. 10, 2012  (KR) .................. 10-2012-0142940

(51) Int. Cl.
*H01M 2/16* (2006.01)
*H01M 2/14* (2006.01)
*H01M 10/052* (2010.01)

(52) U.S. Cl.
CPC ......... H01M 2/1686 (2013.01); H01M 2/145 (2013.01); H01M 2/166 (2013.01);
(Continued)

(58) Field of Classification Search
CPC .... H01M 2/1686; H01M 2/145; H01M 2/166; H01M 2/1606; H01M 2/1646
See application file for complete search history.

(56) References Cited

U.S. PATENT DOCUMENTS

| 7,662,517 B2 | 2/2010 | Lee et al. | |
| 2009/0111026 A1* | 4/2009 | Kim | H01M 2/145 |
| | | | 429/252 |
| 2012/0094184 A1* | 4/2012 | Abe | H01G 9/02 |
| | | | 429/251 |

FOREIGN PATENT DOCUMENTS

| JP | 2004-227972 | 8/2004 |
| KR | 10-0727247 | 6/2007 |

(Continued)

*Primary Examiner* — Jeremiah Smith
(74) *Attorney, Agent, or Firm* — Harness, Dickey & Pierce, P.L.C.

(57) ABSTRACT

There is provided a separator used in an electrochemical device and more particularly, to a porous separator in which an organic/inorganic complex coating layer is applied to a porous substrate, a method for preparing the same, and an electrochemical device using the same.

11 Claims, 3 Drawing Sheets

(52) U.S. Cl.
CPC ....... *H01M 2/1646* (2013.01); *H01M 2/1653* (2013.01); *H01M 2/1606* (2013.01); *H01M 10/052* (2013.01)

(56) References Cited

FOREIGN PATENT DOCUMENTS

| KR | 10-0727248 | 6/2007 |
|----|------------|--------|
| KR | 20120052100 | 5/2012 |
| WO | 2009110726 | 9/2009 |

\* cited by examiner

POROUS SEPARATOR WITH WATER-BASED ORGANIC/INORGANIC COMPLEX COATING, A METHOD FOR PREPARING THE SAME, AND AN ELECTROCHEMICAL DEVICE USING THE SAME

TECHNICAL FIELD

The present invention relates to a separator used in an electrochemical device and more particularly, to a porous separator in which an organic/inorganic complex coating layer is applied to a porous substrate, a method for preparing the same, and an electrochemical device using the same.

BACKGROUND ART

Lithium ion secondary battery is an energy storage device with a high energy density, which can be charged and discharged by reversible conversion between chemical energy and electric energy, and is basically comprised of an anode, a cathode, a separator, and an electrolyte. It has been widely applied to small-sized electronic devices, for example, mobile phones, notebook computers, and the like.

In recent years, in order to deal with environmental issues, high oil prices, and energy efficiency and storage, application of the lithium ion batteries has been rapidly expanded to hybrid electric vehicles (HEV), plug-in EV, e-bikes, and energy storage systems (ESS).

Although the lithium ion battery is a stable electrochemical device insulated by a separator, a short circuit between an anode and a cathode may be caused by internal or external abnormalities of the battery or by shocks and there is a possibility of heating and explosion. Therefore, ensuring thermal/chemical stability of the separator as insulator is the most important consideration.

Further, in recent years, along with an increasing demand for high capacity and high power output of a lithium secondary battery, stability of a battery, that is, stability in generation of explosion and fire, becomes more important. In order to ensure stability of a battery, factors such as voltage, current, impedance, temperature, and the like of a battery cell are generally controlled by an electronic protection circuit or a battery management system (BMS), thereby responding to abnormalities, such as over charge and over current, of the battery.

A polyolefin-based separator commercially used in lithium secondary batteries is a porous film that prevents a short circuit between an anode and a cathode and provides pores serving as a passage of lithium ions. Polyolefin-based separators manufactured by a wet method and a dry method have been widely used commercially.

The wet method is a method including melt-mixing inorganic particles or oil components with polyolefin, extruding the resultant using an extruder to prepare a sheet, forming a thin film by simultaneous or successive biaxial stretching using a roller or a tenter, and extracting the inorganic particles or oil components using a solvent to produce a porous film. This method is commercially used to form a film mainly using polyethylene (PE) among polyolefins. On the other hand, the dry method is a method for forming a porous film by melt-extruding a resin and then stretching the resultant with a roller or a tenter without using an organic solvent, and generally uses polypropylene as the resin and may use polyethylene as necessary.

Herein, in a process for preparing a porous separator, except a non-woven separator, a polyolefin porous separator in which a porous substrate is generally prepared by a film stretching process, cannot avoid a change in volume such as contraction or fusion when a temperature of a battery is increased to 100° C. or more due to an internal or external stimulus, and, thus, an electrical short circuit between an anode and a cathode may cause explosion. Further, if the separator is broken due to dendrite growth within the battery, an internal short circuit may induce explosion of the battery.

There is disclosed a coated separator in which in order to suppress thermal contraction caused by high temperature and instability of the battery caused by dendrite, inorganic particles together with a binder are coated on one or both surfaces of the substrate of the porous separator, and, thus, the inorganic particles suppresses a contraction rate of the substrate and the separator is more stable due to the inorganic coating layer.

In this case, if an organic/inorganic coating layer applied to the porous substrate is not uniformly coated on the porous substrate, when a secondary battery is assembled or within the assembled battery, a part of the inorganic coating layer can be easily separated due to coating defects on the surface. Such separation can decrease stability of the battery. Therefore, a coating system for more uniform organic/inorganic coating is needed to form a uniform inorganic coating layer and ensure an excellent battery property.

As a conventionally well-known technology for a separator with an organic/inorganic coating, a process for preparing a coated porous separator by coating organic/inorganic slurry (PVDF-CTFE/BaTiO$_3$ or PVDF-CTFE/Al$_2$O$_3$) with an organic solvent is described in Korean Patent No. 0775310. This process is identical with a conventional electrode solution molding process using a great amount of an N-methylpyrrolidone (NMP) solvent or acetone as a dispersion medium.

Typically, an organic solvent dissolves a binder (PVDF-CTFE) to provide an excellent adhesive property between inorganic particles in powder form when it evaporates. Slurry prepared from a solution of binder in an organic solvent provides interconnectivity between a porous substrate and an organic/inorganic coating layer, and between inorganic particles within the inorganic coating layer. The components connected as such can endure contraction of a porous separator caused by heating and an external physical event without losing the interconnectivity when a battery is assembled and operated.

However, a coating method based on a binder composition soluble in an organic solvent has some problems. Firstly, a binder soluble in an organic solvent is formed into gel as the organic solvent volatilizes during a drying process, resulting in generation of solvent-impermeable spaces and non-uniformity of an organic/inorganic coating layer, and, thus a battery property may deteriorate. In order to overcome this problem, the binder needs to undergo a secondary drying process in a vacuum at a glass transition temperature Tg or higher. If a residual solvent is present in a product due to insufficient drying, a part of the binder is dissolved and gel may be formed. Thus, if a surface of the coating layer becomes sticky, dust from the outside or unnecessary particles may adhere thereto and a defect rate of products may be increased due to adhesion between coating layers or with a substrate when a product is wrapped. Secondly, if a concentration of the binder in the slurry is high, a viscosity of the slurry is highly increased, which makes it difficult to prepare an organic/inorganic complex layer of a thin film. Further, if a concentration of the binder in the slurry is increased, since a boiling point of the slurry is high, a drying process requires a high temperature. Thirdly, if a low viscosity of the slurry is maintained, an adhesive strength between inorganic particles and a porous substrate or between inorganic particles is decreased, and, thus the inorganic particles are easily separated. Fourthly, in a process based on an organic solvent, a dry zone of a drying line is elongated due to a critical explosion limit in drying, and, thus, it is difficult to improve a processing speed. Fifthly, since an organic solvent has volatility, from the moment the slurry is exposed to the external environment, the organic solvent continuously volatilizes. Therefore, a concentration and a rheological property of the slurry are changed due to evaporation of the solvent during the slurry is prepared, transferred, and coated, which may affect a coating quality of a final product. Sixthly, when a coated separator is prepared, risk factors for safety, healthy, and environment are inherent. Since an organic solvent has toxicity, inflammability, and volatility due to its characteristics, in order to lower the risks due to the organic solvent and reduce environmental pollution, the organic solvent needs to be specially prepared and managed. Therefore a preparation method of the organic/inorganic coating separator using a binder soluble in an organic solvent has limitations in view of characteristics of a battery and characteristics of a preparing process.

Meanwhile, Japanese Patent Laid-open Publication No. 2004-227972 describes a method for preparing a coating separator including a water-soluble polymer and fine particles. According to this method, slurry in which alumina particles having average size of 13 nm are dispersed in carboxymethyl cellulose (CMC) aqueous solution, is casted on a polyethylene porous film to form an organic/inorganic complex layer, thereby preparing a coated separator.

However, considering that a case where a separator is coated using only carboxyl methyl cellulose without using alumina particles and a case where a separator is coated using alumina particles are similar in dimensional stability, an effect of controlling a thermal dimensional stability by alumina particles in a separator is not confirmed.

Further, as described above, if small alumina particles of 0.1 μm or less are used, particle dispersion stability in the slurry is decreased, which may induce instability of coating. Fine particles of smaller size than pores in a porous separator infiltrate into the pores and block the pores. Thus, after coating, permeability of the separator is sharply decreased.

As a method for improving an adhesive strength between a porous substrate and a coating layer, Korean Patent Laid-open Publication No. 2012-0052100 describes a technology for preparing a separator having two coating layers, including: forming an organic/inorganic complex layer by casting a slurry in which styrene-butadiene rubber (SBR) and carboxyl methyl cellulose (CMC) are dissolved in acetone as an organic solvent, onto a polyethylene porous film; and carrying out an electric radiation of a polymer solution thereon. If an organic/inorganic complex layer is formed by this method, the above-described problems of the coating method using the organic solvent also occur. When a coating separator is formed in three layers by radiation onto an inorganic coating layer in order to solve the problem caused by separation of inorganic substances due to a low adhesive strength with a substrate, since a film is formed by the radiation, it is difficult to overcome the problem of a thickness control of a coating layer, and, thus this technology does not satisfy a recent trend in which a coating separator is demanded to be thinner. Further, due to low uniformity in pore, a current cannot be uniformly distributed but concentrated on a single point when being applied to a battery, and, thus, partial heating, degradation, and explosion may occur. Therefore, it does not provide a fundamental technical suggestion of an organic/inorganic coating separator.

In order to solve a problem that coating materials are easily separated due to a low adhesive strength between a porous substrate and a coating layer when a porous separator having an organic/inorganic coating is prepared by the above-described prior methods, Korean Patent No. 1125013 describes a method for preparing a cross-linked ceramic-coated separator using a water-soluble ionic polymer. This method also uses an ionic polymer which can be dissolved in water, but the ionic polymer is not dispersed in water but completely dissolved in water, and, thus, it cannot avoid confinement of the solvent. Since the amount of dimethylacetamide used as an organic solvent is 15 times more than that of water, it does not provide a fundamental suggestion of a coating method using water. In order to induce chemical crosslinking after coating for the purpose of improving an adhesive strength with a substrate, a crosslinking agent and an initiator need to be added together with the organic solvent during a preparation process of slurry, and during a drying process, a heat or UV treatment for 20 hours or more is essentially required. However, if a crosslinking agent and an initiator are added to a slurry solution, before the slurry is applied to the porous substrate, the slurry is partially cross-linked by itself by heat and energy externally applied while a coating solution is stored and transferred, resulting in solidification of the slurry. Thus, uniformity of the coated separator is finally decreased. Further, since a heat treatment and a UV treatment requiring a long time are needed even during a drying process, productivity may be very limited, and a porous substrate of a thin film may be damaged due to high temperature/high energy during the drying process, which may cause deterioration in properties and air permeability of a separator.

SUMMARY OF THE INVENTION

An object of the present invention is to solve the conventional problems as described above. The object of the present invention is to provide a separator having an organic/inorganic complex coating that improves thermal and chemical stability of a porous substrate by coating the porous substrate with a coating solution in which inorganic particles and polymer binders are dispersed in an emulsion state or in a suspension state in water, has excellent permeability and adhesive property, provides an adhesive property by itself without use of a crosslinking agent and heat energy or UV energy, thereby solving the problem of damage to the porous substrate caused by crosslinking and self-crosslinking of the slurry, and improves ionic conductivity of lithium and electrolyte uptake by improving wettability of an electrolyte, and a method for preparing the same.

Another object of the present invention is to provide an electrochemical device that comprises the organic/inorganic complex coating separator and thus can be improved in performance and stability of a battery and the electrochemical device.

DETAILED DESCRIPTION OF THE INVENTION

In an organic/inorganic complex coating porous separator of the present invention, a water-based coating solution in which inorganic particles and a polymer binder are dispersed in water, is coated on at least one region selected from a group consisting of at least one surface of a porous substrate and at least a part of pore portions in the porous substrate.

In the present invention, the porous substrate may employ any porous substrate generally used in an electrochemical device such as a lithium secondary battery, and may include, for example, a film or non-woven fabric formed using one or more selected from a group consisting of high-density polyethylene, low-density polyethylene, linear low-density polyethylene, ultra high-molecular weight polyethylene, polypropylene, polyethylene terephthalate, polybutylene terephthalate, polyester, polyacetal, polyamide, polycarbonate, polyimide, polyetherether ketone, polyether sulfone, polyphenylene oxide, polyphenylene sulfide, polyethylene naphthalene, and the like.

A surface of the porous substrate may be treated using a surface treatment technology such as a corona, plasma, or high-energy radiation treatment such that the water-based coating solution can be uniformly coated on the porous substrate with more efficiency.

The porous substrate can ensure high permeability and adhesive strength even if the porous substrate does not undergo such a surface treatment. However, if the porous substrate undergoes the surface treatment, higher permeability and adhesive strength can be obtained, and wettability with respect to an electrolyte within the battery can be improved. Thus, it is more advantageous to carry out the surface treatment.

The porous substrate may be prepared to have a thickness ranging from 1 to 100 µm, and preferably, 1 to 30 µm. Along with a recent trend of high power output/high capacity of a battery, it is advantageous to use a thin film as the porous substrate. A pore diameter of the porous substrate is in a range of 0.01 to 50 µm, and a porosity is 10 to 90%. However, these numerical ranges can be easily modified depending on an embodiment or as necessary.

The inorganic particles used in the water-based coating solution of the present invention may employ any inorganic particles typically used in preparing a conventional coating separator for battery without any limitation. The inorganic particles may include one or more selected from $SnO_2$, $BaTiO_2$, $Al_2O_3$, $CeO_2$, $SiO_2$, $TiO_2$, $Li_3PO_4$, NiO, ZnO, MgO, $Mg(OH)_2$, CaO, $ZrO_2$, $Y_2O_3$, and talc.

The inorganic particles are not limited in size, but for preparing a slurry with good dispersion stability and for forming a coating layer having a uniform thickness, the inorganic particles may have an average particle size of preferably 0.001 to 10 µm, and most preferably 0.1 to 5 µm. The inorganic particles may have a shape such as a sphere shape, a plate shape, or an irregular shape.

If a size of the inorganic particle is less than 0.001 µm, dispersibility of the inorganic particles may be decreased, or the inorganic particles may be distributed within the already-formed pores, and, thus, air permeability may be decreased. If a size of the inorganic particle is more than 10 µm, a thickness of the organic/inorganic complex coating layer is increased, resulting in deterioration in mechanical properties, or the possibility of an internal short circuit during charge and discharge of the battery is increased due to the excessively large pores. Further, due to an increase in overall thickness of the organic/inorganic complex coating separator, there may be a limitation in manufacturing a middle or large-sized battery cell which is thin and has high capacity.

The polymer binder used in the water-based coating solution of the present invention comprises a first organic binder and a second organic binder, and may further optionally comprise a third organic binder. The first organic binder and the second organic binder essentially used in the water-based coating solution of the present invention enable adhesion and fixation between the inorganic particles and between the inorganic particles and the surface of the porous substrate, thereby preventing physical deformation and deterioration of properties of the porous substrate. The third binder has a function of a thickener for increasing viscosity of the water-based coating solution and thus improves wettability of the coating solution with respect to the porous substrate during a coating process.

Among the polymer binders, the first organic binder refers to an emulsion in which a water-insoluble polymer is dispersed in water or a binder dispersed in water by suspension polymerization or a post-process, and it is a water-based binder in which emulsified or suspended droplets may have a size distribution.

The first organic binder may employ any polymer emulsion in which the polymer is dispersed in water, without any limitation. Specific examples of the first organic binder may include one or two or more selected from a group consisting of emulsion and suspension of at least one polymer selected from a group consisting of polystyrene, styrene butadiene rubber (SBR), nitrile-based rubber (NBR), polyolefins, acryl-based polymer, acetate-based polymer, PVDF-based copolymer or PVD-based copolymer, ethylene-vinyl acetate (EVA)-based polymer, polyvinyl butyral-based polymer, and polytetrafluoro ethylene (PTFE)-based polymer.

Since the first organic binder as described above is used in the present invention, a size of the dispersed binder can be regulated by temperature, pH, or concentration of an emulsifier during a preparation process thereof. Therefore, it is possible to more effectively regulate an adhesive strength between the inorganic particles or between the inorganic particles and the substrate.

The second organic binder is a water-soluble polymer and has a function of more effectively improving an adhesive strength between the inorganic particles or between the inorganic particles and the substrate and a coating property by inducing an attraction force between the first organic binder and the polymer, and refers to a water-soluble polymer of which a main chain has an ionic character, a copolymer with a water-soluble polymer compound, or a water-soluble polymer itself. Specific examples of the second organic binder may include phosphoric ester, phosphoric acryl-based copolymer, modified polyacrylate-based copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, and metallic salts thereof, and one or two or more of them may be used. In order for the second organic binder to express a more effective function, the second organic binder may have an ionic character as well as the above-described structure, or may have a structure in which cross-linking is caused by heat during a drying process. The most preferable example is a polyacryl polyether copolymer represented by the following formula:

where, $R_1$, $R_2$, and $R_3$ independently represents hydrogen, or alkyl having 1 to 10 carbon atoms, $R_4$ represents ether having 1 to 100 carbon atoms, M is selected from the group consisting of a hydrogen atom or a cation, and m and n is a number selected such that a weight average molecular weight Mw of the copolymer can be 40000 or less.

The third organic binder may be further added for improvement in a dispsersion effect of the inorganic particles in the water-based coating solution, improvement in dispersibility by regulating viscosity of the water-based coating solution, and improvement in characteristics of the battery as well as efficiency of a coating process. The third organic binder may employ any water-soluble polymer without limitation. Specific examples of the third organic binder may include one or more selected from the group consisting of polyethylene oxide (PEO), carboxy methyl cellulose (CMC), polyvinyl alcohol (PVOH), polyvinyl pyrrolidone (PVP), starch, an ionic polymer and the like.

A preferable weight ratio of the water the inorganic particles used in the water-based coating solution of the present invention is 95:5 to 20:80, a preferable weight ratio of the inorganic particles:the first organic binder is 4:1 to 140:1, and a preferable weight ratio of the inorganic particles:the second organic binder is 10:1 to 200:1. Within the above ranges, it is possible to obtain an organic/inorganic complex coating porous separator having an excellent adhesive strength, which is preferable.

If a weight ratio of the inorganic particles to water is higher than 80, a dispersion status of the inorganic particles becomes unstable, and, thus, agglomeration is highly likely to occur and it is difficult to regulate uniformity in thickness of the coating layer. If a weight ratio of the inorganic particles to water is lower than 5, an amount of water to be dried per unit area during a coating process is increased, and, thus, it is difficult to increase a line speed to a certain level or higher in a dry zone having a limited length, which is not preferable.

If a weight ratio of the inorganic particles to the first organic binder is lower than 4:1, an amount of the first organic binder is high with respect to the inorganic particles, and, thus, air permeability and performance of the battery are decreased. If a weight ratio is higher than 140:1, an amount of the first organic binder is low and an amount of the inorganic particles is excessively high, and, thus, an adhesive strength between the inorganic particles or between the porous substrate and the inorganic particles is decreased, resulting in separation therebetween, which is not preferable.

If a weight ratio of the inorganic particles to the second organic binder is lower than 10:1, an amount of the second organic binder is high, and, thus, a C-rate and a cycle property of the battery may be decreased, which is not preferable. If a weight ratio is higher than 200:1, an amount of the second organic binder is low, and, thus, an adhesive strength between the inorganic particles or between the porous substrate and the inorganic particles, or a thermal contraction rate of the organic/inorganic complex coating porous separator may deteriorate, which is not preferable.

Only the first organic binder and the second organic binder may be used without the third organic binder. However, in this case, since the binders that are the aqueous solution are dispersed in water, it may be difficult to regulate viscosity of the final slurry coating solution, and, thus, it may be difficult to uniformly coat the slurry coating solution on the porous substrate during various coating processes. Therefore, it is more advantageous to use the third organic binder. That is, when the third organic binder is used, it is possible to more effectively improve dispersability of the inorganic particles and also possible to regulate rheology of the coating solution, and, thus, it is possible to carry out uniform coating. When the coating solution is prepared, a preferable weight ratio of the first organic binder:the third organic binder is 100:0 to 5:95. If a weight ratio of the first organic binder:the third organic binder is 100:0, that is, without the third organic binder, the coating solution can be prepared with only the first organic binder and the second organic binder. However, if a weight ratio of the first organic binder:the third organic binder is higher than 5:95, viscosity of the coating solution is too high or dispersability of the inorganic particles is low, and, thus, applicable coating processes are limited and an adhesive strength between the inorganic particles or between the substrate and the inorganic particles is decreased, which is not preferable.

As for the third organic binder, an amount to be added may be regulated depending on a coating method. An amount to be added may be regulated according to a coating method such as dip-coating, die-coating, and Gravure-coating generally used, and, thus, it is possible to simply solve a problem of limitation in a content ratio between a binder and inorganic particles in a conventional method of preparing a coating solution by dissolving a binder in an organic solvent. Further, due to a use of the third organic binder, an amount of solids in the coating solution can be freely regulated from a low concentration to a high concentration, and in order to improve characteristics of the battery which have influence on ionic conductivity, an amount of the third organic binder to be added may be regulated.

In the present invention, in order to prepare a coating solution having an excellent dispersion state of the inorganic particles, various additives may be further used. Various additives may be used depending on a purpose, and may include a wetting/dispersion agent for dispersion, a water-based wetting agent for further improving wettability, an antifoaming agent and an defoaming agent for suppressing generation of foam, a leveling agent for improving flatness, and a rheology modifier for regulating liquidity. For battery properties within the battery, the additives may be added as small as possible and preferably no additives may be added. However, in the present invention, for more uniform organic/inorganic complex coating, preferably, a polymeric wetting/dispersion agent may be added to prevent sedimentation, coagulation, and floating of the inorganic particles and maintain dispersibility of the inorganic particles.

Preferably, the organic/inorganic complex coating separator according to the present invention has a thickness of 0.1 to 50 µm, a pore size of 0.001 to 10 µm, and a porosity of 20 to 80%. If the separator has a thickness of less than 0.1 µm, a pore size of less than 0.001 µm, or a porosity of less than 20%, pores are filled with a small amount of an electrolyte, and, thus, a lithium ion transfer capability is decreased or performance of a cell deteriorates, which is not preferable. If the separator has a thickness of more than 50 µm, a pore size of more than 10 µm, or a porosity of more than 80%, a mechanical properties of the porous separator may deteriorate.

A method for preparing the organic/inorganic complex coating porous film according to the present invention comprises the following steps:

(1) a step of preparing an aqueous polymer solution by dissolving a second organic binder and selectively a third organic binder in water;

(2) a step of preparing a mixed solution by adding inorganic particles to the aqueous polymer solution obtained in the step (1) and mixing the resultant to disperse the inorganic particles therein;

(3) a step of obtaining a coating solution by adding a first organic binder (water-based emulsion) to the mixed solution of the step (2) and mixing the resultant; and (4) a step of coating at least one region selected from a group consisting of at least one surface of a porous substrate and at least a part of pore portions in the porous substrate with the coating solution obtained in the step (3) and drying the resultant.

In the step (1), a polymer solution having viscosity of 1 to 50,000 mPa·s can be prepared by adding the second organic binder and selectively the third organic binder in a container of water at room temperature or higher temperature.

In the step (2), after the inorganic particles are added to the polymer compound solution obtained in the step (1), the inorganic particles are dispersed using a typical dispersion method known in the art with, for example, an ultrasonic homogenizer, a ball-mill, a disperser, a mixer, and the like, and particularly preferably a ball-mill. In this step, a dispersion processing time may vary depending on a capacity, and preferably, it is 1 to 20 hours. A particle size of the crushed inorganic particles can be controlled depending on a size of beads used for the ball-mill and a time for ball-milling, and preferably, it is 0.001 to 10 μm as described above.

In the step (2), a dispersion state of particles may deteriorate depending on size and shape of the inorganic particle, and chemical structure of the surface of the particle. If a polymeric wetting and dispersion agent is added as necessary, the inorganic particles can be more effectively dispersed. Generally, an amount of the wetting and dispersion agent may vary depending on size, chemical structure, and surface area of inorganic particles, but appropriately, it is 0 to 3 parts by weight with respect to 100 parts by weight of the inorganic particles.

In the step (3), the first organic binder is added to the mixed solution in which the inorganic particles are dispersed in the aqueous solution (aqueous polymer solution) of the second organic binder and the selectively added third organic binder, thereby preparing the organic/inorganic waterborne coating solution.

Before the inorganic particles are dispersed in the step (2), the first organic binder may be added to the aqueous solution of the second organic binder and the selectively added third organic binder. However, it is more advantageous to add the first organic binder to the aqueous solution in which the inorganic particles are dispersed in the aspect of manufacturing of a stable inorganic particle coating solution.

Before the coating solution obtained in the step (3) is used for coating in the step (4), additives may be selectively added in a small amount to the coating solution depending on viscosity or surface energy of the finally obtained coating solution.

For example, a wetting agent for improving wettability of the coating solution with respect to the porous substrate, a leveling agent for improving surface flatness of the coating layer, an adhesion promoter for improving an adhesive strength between the porous substrate and the coating solution, and additives applicable for improving a coating property such as a thickener, a rheology additive, and a UV absorber may be added. The additives can be selectively used depending on a required coating method and coating characteristics, and an amount of each additive to be used is 0 to 5 parts by weight with respect to 100 parts by weight of the coating solution prepared in the step (3).

In the step (4), the coating solution prepared in the step (3) is coated and dried on the porous substrate, thereby finally preparing the organic/inorganic complex coating porous film according to the present invention. In this step, the method for coating the coating solution on the porous substrate may employ a typical coating method known in the art. For example, by dip coating, die coating, roll coating, comma coating, Gravure coating, bar coating, or a combination thereof, a single layer or multiple layers may be coated on a single surface (one-side surface) or both surfaces of the porous substrate, and one or more regions selected from at least a part of pore portions.

An electrochemical device according to the present invention includes the organic/inorganic complex coating porous separator according to the present invention as described above.

In the electrochemical device including an anode, a cathode, and an electrolyte, the organic/inorganic complex coating porous separator may be used as a separator between the anode and the cathode.

The electrochemical device includes all devices that make electrochemical reactions. Specific examples of the electrochemical device may include all kinds of primary/secondary batteries, fuel cells, solar cells, or super capacitors, and, in particular, a lithium secondary battery is the most preferable.

The electrochemical device can be manufactured by a typical method known in the art, and can be manufactured by interposing the organic/inorganic complex coating porous separator according to the present invention between the anode and the cathode and injecting the electrolyte.

A cathode, an anode, and an electrolyte to be applied to the electrochemical device of the present invention are not specifically limited and may employ those typically used in the art without limitation.

Advantageous Effects

According to the present invention, since a uniform porous organic/inorganic complex coating layer is formed using a water-based coating solution and a porous substrate, an adhesive strength between inorganic particles or between the porous substrate and the inorganic particles is high and thermal contraction at a high temperature can be prevented. Further, the water-based coating solution uses a solvent based on eco-friendly water and enables high-speed coating and commercial mass-production of a lower priced organic/inorganic complex coating porous film. Furthermore, an electrochemical device using the organic/inorganic complex coating porous film of the present invention as a separator is excellent in thermal and electrochemical safety.

BRIEF DESCRIPTION OF DRAWINGS

FIG. 1 provides FE-SEM images of the organic/inorganic complex coating porous separator prepared in Example 1, in which FIG. 1a and FIG. 1b illustrate a coating layer and a porous substrate, respectively.

EXAMPLES

The present invention can be modified and changed in various ways and may include various exemplary embodiments. Although preferred Examples are provided as follows for easy understanding of the present invention, the following Examples are provided just for illustrating the present invention but not for limiting the scope of the present invention.

The property measurement methods applied in the following Examples, Comparative Examples, and Experimental Examples are as follows.

Property Measurement Method

1. Coating Thickness Measurement Method

As a coating thickness gauge, a digimatic thickness gage 547-401 (Φ6.3 mm flat tip type, pressure of 3.5 N or less for measurement) manufactured by Mitutoyo was used for measurement, and a difference between a thickness of a coating separator and a thickness of an original film before coating was calculated.

2. Adhesive Strength Measurement Method

After a tape of 18 mm×20 mm (adhesion area) was attached onto a coating separator, a load was applied thereto for 10 minutes. Then, an adhesive strength was measured with a LLOYD UTM. Herein, as for the adhesive strength, a force applied to pull the tape at a speed of 2 mm/min until the tape was detached was measured using a 180 degree peel test.

3. Air Permeability (Gurley) Measurement Method

As for air permeability, a permeation time of 100 cc of air was measured with a densometer (manufactured by Toyoseiki Co., Ltd.) (ISO 5635/5).

4. Thermal Contraction Rate Measurement Method

A sample was cut into a size of 50 mm×50 mm, and vertical and horizontal lines (3 cm×3 cm) were drawn on a central portion of the sample. Then, the sample was left in an oven at a temperature of 150° C.±5 for 1 hour. Thereafter, the sample was taken out of the oven and left at room temperature for 5 minutes to be cooled to room temperature. Then, lengths of the lines drawn on the central portion of the sample were measured to calculate a contraction rate with respect to the lengths before contraction.

5. Tensile Strength Measurement Method

For measurement of a tensile strength, a universal testing machine (LLOYD UTM manufactured by Lloyd) was used. A sample was cut into a size of 10 mm×50 mm in MD and TD directions, respectively. Then, a tensile strength was measured at a speed of 100 mm/min at a grip interval of 20 mm.

6. Piercing Strength Measurement Method

A Katotech KES-G5 as a piercing strength gauge was used for measurement. A sample to be measured was fixed, and a needle of Φ1.0 mm having a ball-shaped tip pierced at a speed of 2 mm/sec and a strength was measured at the time when a separator was ruptured.

7. Ionic Conductivity Measurement Method

An ionic conductivity of a conductivity cell manufactured using each sample was measured. The conductivity cell is a coin cell type assembled by positioning a separator (Φ18 mm) between two metal masks (SUS Plate) (Φ16 mm) having the same size, and filling an ethylene carbonate/ethyl methyl carbonate/diethyl carbonate (EC/EMC/DEC=3:2:5)-based electrolyte in which lithium hexafluoro phosphate ($LiPF_6$) was dissolved. The cell was left at room temperature for 24 hours for wetting of the separator with respect to the electrolyte, and then, measurement was carried out using a VSP at room temperature (25° C.)

Examples 1 to 19 and Comparative Examples 1 to 10

Example 1

1-1. Preparation of Organic/Inorganic Complex Coating Porous Separator ($SBL/Al_2O_3$)

A polyacryl polyether copolymer as a second organic binder and $Al_2O_3$ powder were added to water. The $Al_2O_3$ powder was added to be solid content of 30 weight %, and the second organic binder was added in a weight ratio of $Al_2O_3$ powder/polyacryl polyether copolymer of 15/1. The resultant subjected to ball-milling for 3 hours or more to crush and disperse inorganic particles, thereby preparing waterborne inorganic slurry. A particle diameter of the $Al_2O_3$ in the slurry after crushing can be controlled depending on a diameter of beads used for the ball-mill and a time for the ball-milling. In Example 1, the slurry was prepared by crushing the inorganic particles to have an average particle size of 0.4 μm. A waterborne styrene-butadiene latex (SBL) emulsion was added to the slurry to contain $Al_2O_3$/SBL of 40/1 (weight ratio) and then stirred for about 2 hours or more to uniformly disperse the emulsion in the slurry, thereby preparing a coating solution. As a porous substrate, a corona-treated uniaxially oriented polypropylene film (porosity of 45%) having a thickness of 14 μm was used. The coating solution was coated on both surfaces of the separator by a dip-coating method, so that an organic/inorganic complex coating porous separator having a thickness of 20 μm was finally prepared.

As a result, air permeability (gurley) of the coating separator was 240 sec/100 cc, which was similar to that of Comparative Example 1 to be described below. And a thermal contraction rate of the coating separator was greatly decreased from 35% to 4.2% as compared with Comparative Example 1. Further, as described below, as compared with Comparative Example 3 where PVDF-HFP was used as a first organic binder, an adhesive strength was increased and a thermal contraction rate was decreased.

1-2. Preparation of Lithium Secondary Battery

A coin cell type lithium secondary battery was prepared using a $LiNiCoMnO_2$-based electrode as an anode typically used, a graphite electrode as a cathode, and an ethylene carbonate/ethyl methyl carbonate/diethyl carbonate (EC/EMC/DEC=3:2:5)-based electrolyte in which lithium hexafluoro phosphate ($LiPF_6$) was dissolved, as an electrolyte.

Example 2

An organic/inorganic complex coating porous separator and a lithium secondary battery including the same were prepared in the same manner as Example 1 except that instead of water, a third organic binder aqueous solution prepared by adding sodium carboxyl methyl cellulose (CMC) in an amount of about 0.5 weight % to water and dissolving at 50° C. for about 2 hours was used for preparing waterborne inorganic slurry containing a polyacryl polyether copolymer as a second organic binder and $Al_2O_3$ powder.

As a result, air permeability of the coating separator was 240 sec/100 cc, which was equivalent to that of Example 1, and a thermal contraction rate was decreased to 3.3% as compared with Example 1.

Example 3

An organic/inorganic complex coating porous separator and a lithium secondary battery including the same were prepared in the same manner as Example 2 except that instead of sodium carboxyl methyl cellulose (CMC), starch was used as a third organic binder.

As a result, the coating separator exhibited air permeability of 250 sec/100 cc and a thermal contraction rate of 4%, which were substantially equivalent to those of Example 1.

Example 4

An organic/inorganic complex coating porous separator and a lithium secondary battery including the same were prepared in the same manner as Example 2 except that instead of sodium carboxyl methyl cellulose (CMC), polyethylene oxide (PEO) was used as a third organic binder. As a result, the prepared coating separator exhibited properties substantially equivalent to those of Example 3.

Example 5

An organic/inorganic complex coating porous separator and a lithium secondary battery including the same were prepared in the same manner as Example 2 except that a polypropylene film having a thickness of 14 μm without a corona treatment was used as a porous substrate.

As a result, an adhesive strength and a thermal contraction rate of the prepared coating separator were slightly decreased as compared with Example 2, but exhibited properties substantially equivalent to those of Example 2.

Example 6

An organic/inorganic complex coating porous separator and a lithium secondary battery including the same were prepared in the same manner as Example 2 except that a polypropylene film used as a porous substrate had a thickness of 11 μm, instead of 14 μm.

As a result, due to an effect of a thickness of the porous substrate, air permeability of the coating separator was increased to 200 sec/100 cc as compared with Example 2, and a thermal contraction rate was decreased to 1.8% as compared with Example 2.

Example 7

An organic/inorganic complex coating porous separator and a lithium secondary battery including the same were prepared in the same manner as Example 2 except that a mixing ratio of $Al_2O_3$ powder and a polyacryl polyether copolymer used as a second organic binder was changed to $Al_2O_3$ powder/polyacryl polyether copolymer=30/1 (weight ratio) instead of $Al_2O_3$ powder/polyacryl polyether copolymer=15/1 (weight ratio).

As a result, the coating separator exhibited air permeability of 230 sec/100 cc and a thermal contraction rate of 3%, which were substantially equivalent to those of Example 2.

Example 8

An organic/inorganic complex coating porous separator and a lithium secondary battery including the same were prepared in the same manner as Example 2 except that a mixing ratio of $Al_2O_3$ powder and a polyacryl polyether copolymer used as a second organic binder was changed to $Al_2O_3$ powder/polyacryl polyether copolymer=100/1 (weight ratio) instead of $Al_2O_3$ powder/polyacryl polyether copolymer as =15/1 (weight ratio).

As a result, the coating separator exhibited air permeability of 540 sec/100 cc, which was decreased as compared with Example 2, and a thermal contraction rate of 7.2%, which was slightly increased as compared with Example 2.

Example 9

An organic/inorganic complex coating porous separator and a lithium secondary battery including the same were prepared in the same manner as Example 2 except that as a second organic binder, polyalkyl ammonium amide was used instead of polyacryl polyether copolymer.

As a result, the coating separator exhibited air permeability of 520 sec/100 cc, which was decreased as compared with Example 2, and a thermal contraction rate of 6.8%, which was slightly increased as compared with Example 2.

Example 10

An organic/inorganic complex coating porous separator and a lithium secondary battery including the same were prepared in the same manner as Example 2 except that as a second organic binder, polycarboxylic acid-siloxane copolymer was used instead of polyacryl polyether copolymer.

As a result, the coating separator exhibited air permeability of 510 sec/100 cc, which was decreased as compared with Example 2, and a thermal contraction rate of 8.4%, which was slightly increased as compared with Example 2.

Example 11

An organic/inorganic complex coating porous separator and a lithium secondary battery including the same were prepared in the same manner as Example 2 except that a mixing ratio of $Al_2O_3$ powder and SBL used as a first organic binder was changed to $Al_2O_3$ powder/SBL=20/1 (weight ratio) instead of $Al_2O_3$ powder/SBL=40/1 (weight ratio).

As a result, the prepared coating separator exhibited air permeability of 280 sec/100 cc and a thermal contraction rate of 3.5%, which were substantially equivalent to those of Example 2, but an adhesive strength thereof was highly increased to 550 gf as compared with Example 2.

Example 12

An organic/inorganic complex coating porous separator and a lithium secondary battery including the same were prepared in the same manner as Example 2 except that as a first organic binder, EVA emulsion was used instead of SBL emulsion.

As a result, the prepared coating separator exhibited air permeability of 350 sec/100 cc, which was decreased as compared with Example 2, and a thermal contraction rate of 20%, which was increased as compared with Example 2.

Example 13

An organic/inorganic complex coating porous separator and a lithium secondary battery including the same were prepared in the same manner as Example 11 except that as a first organic binder, an acryl-based emulsion was used instead of SBL emulsion.

As a result, the prepared coating separator exhibited an adhesive strength of 450 gf, which was slightly increased as compared with Example 2, and a thermal contraction rate of 2%, which was decreased as compared with Example 2.

Example 14

An organic/inorganic complex coating porous separator and a lithium secondary battery including the same were prepared in the same manner as Example 13 except that as a porous substrate, a polyethylene film was used instead of a polypropylene film.

As a result, the prepared coating separator exhibited air permeability of 260 sec/100 cc, a thermal contraction rate of 2.7%, a piercing strength of 530 gf, and an adhesive strength of 400 gf which was substantially equivalent to that of Example 13.

Example 15

An organic/inorganic complex coating porous separator and a lithium secondary battery including the same were prepared in the same manner as Example 7 except that the organic/inorganic complex coating porous separator coated both surfaces was prepared by a die-coating method instead of a dip-coating method.

As a result, the prepared coating separator exhibited properties substantially equivalent to those of Example 2.

Example 16

An organic/inorganic complex coating porous separator and a lithium secondary battery including the same were prepared in the same manner as Example 15 except that a coating separator having a thickness of 17 μm was finally prepared by coating a single surface of a polypropylene film (porosity of 45%) having a thickness of 14 μm using a die-coating method.

As a result, the prepared coating separator exhibited a thermal contraction rate of 12%, which was increased as compared with Example 2, and air permeability of 220 sec/100 cc and an adhesive strength of 340 gf, which were equivalent to those of Example 2.

Example 17

An organic/inorganic complex coating porous separator and a lithium secondary battery including the same were prepared in the same manner as Example 15 except that as a porous substrate, a polyethylene film was used instead of a polypropylene film.

As a result, the prepared coating separator exhibited air permeability of 230 sec/100 cc, which was equivalent to that of Example 2, a thermal contraction rate of 1.8%, which was decreased as compared with Example 2, and a piercing strength of 530 gf and an adhesive strength of 450 gf, which were highly increased as compared with Example 2.

Example 18

An organic/inorganic complex coating porous separator and a lithium secondary battery including the same were prepared in the same manner as Example 15 except that there was used $Al_2O_3$ powder crushed to have a particle diameter of 0.7 μm instead of 0.4 μm.

As a result, the prepared coating separator exhibited air permeability of 280 sec/100 cc and a thermal contraction rate of 3.4%, which were substantially equivalent to those of Example 2.

Example 19

An organic/inorganic complex coating porous separator and a lithium secondary battery including the same were prepared in the same manner as Example 15 except that there was used $Al_2O_3$ powder crushed to have a particle diameter of 1.1 μm instead of 0.4 μm.

As a result, the prepared coating separator exhibited air permeability of 320 sec/100 cc which was slightly decreased as compared with Example 2, and a thermal contraction rate of 3.7%. And the other properties were substantially equivalent to those of Example 2.

The compositions and property measurement results of the coating separators prepared in Examples 1 to 19 were as illustrated in the following Tables 1 to 4.

TABLE 1

| | Example 1 | Example 2 | Example 3 | Example 4 | Example 5 |
|---|---|---|---|---|---|
| Porous substrate | PP | PP | PP | PP | PP |
| Substrate thickness (μm) | 14 | 14 | 14 | 14 | 14 |
| Corona treatment | ○ | ○ | ○ | ○ | X |
| Coating solvent | Water | Water | Water | Water | Water |
| Inorganic particle diameter (μm) | 0.4 | 0.4 | 0.4 | 0.4 | 0.4 |
| First organic binder | SB | SB | SB | SB | SB |
| Second organic binder | Polyacryl polyether | Polyacryl polyether | Polyacryl polyether | Polyacryl polyether | Polyacryl polyether |
| Third organic binder | — | CMC | Starch | PEO | CMC |
| P/B ratio (first binder) | 40/1 | 40/1 | 40/1 | 40/1 | 40/1 |
| P/B ratio (second binder) | 15/1 | 15/1 | 15/1 | 15/1 | 15/1 |
| Coated surface | Both surfaces | Both surfaces | Both surfaces | Both surfaces | Both surfaces |
| Coating separator thickness (μm) | 20 | 20 | 20 | 20 | 20 |
| Coating method | Dip | Dip | Dip | Dip | Dip |

TABLE 1-continued

|  | Example 1 | Example 2 | Example 3 | Example 4 | Example 5 |
|---|---|---|---|---|---|
| Gurley (sec/100 cc) | 240 | 240 | 250 | 250 | 250 |
| Piercing strength (gf) | 230 | 230 | 230 | 230 | 230 |
| Adhesive strength (kgf) | 320 | 340 | 340 | 260 | 150 |
| Thermal contraction rate (150° C., 1 hr) | 4.2 | 3.3 | 4.0 | 4.8 | 4.8 |
| MD tensile strength (kgf/cm$^2$) | 1020 | 980 | 1020 | 1020 | 1020 |

TABLE 2

|  | Example 6 | Example 7 | Example 8 | Example 9 | Example 10 |
|---|---|---|---|---|---|
| Porous substrate | PP | PP | PP | PP | PP |
| Substrate thickness (μm) | 11 | 14 | 14 | 14 | 14 |
| Corona treatment | ○ | ○ | ○ | ○ | ○ |
| Coating solvent | Water | Water | Water | Water | Water |
| Inorganic particle diameter (μm) | 0.4 | 0.4 | 0.4 | 0.4 | 0.4 |
| First organic binder | SB | SB | SB | SB | SB |
| Second organic binder | Polyacryl polyether | Polyacryl polyether | Polyacryl polyether | Polyalkyl ammonium amide | Poly(carboxylic acid-siloxane) |
| Third organic binder | CMC | CMC | CMC | CMC | CMC |
| P/B ratio (first binder) | 40/1 | 40/1 | 40/1 | 40/1 | 40/1 |
| P/B ratio (second binder) | 15/1 | 30/1 | 100/1 | 15/1 | 15/1 |
| Coated surface | Both surfaces | Both surfaces | Both surfaces | Both surfaces | Both surfaces |
| Coating separator thickness (μm) | 14 | 20 | 20 | 20 | 20 |
| Coating method | Dip | Dip | Dip | Dip | Dip |
| Gurley (sec/100 cc) | 200 | 230 | 540 | 520 | 510 |
| Piercing strength (gf) | 230 | 200 | 230 | 210 | 220 |
| Adhesive strength (kgf) | 340 | 330 | 310 | 340 | 320 |
| Thermal contraction rate (150° C., 1 hr) | 1.8 | 3.0 | 7.2 | 6.8 | 8.4 |

TABLE 2-continued

|  | Example 6 | Example 7 | Example 8 | Example 9 | Example 10 |
|---|---|---|---|---|---|
| MD tensile strength (kgf/cm$^2$) | 800 | 1020 | 980 | 1020 | 1020 |

TABLE 3

|  | Example 11 | Example 12 | Example 13 | Example 14 |
|---|---|---|---|---|
| Porous substrate | PP | PP | PP | PE |
| Substrate thickness (μm) | 14 | 14 | 14 | 14 |
| Corona treatment | ○ | ○ | ○ | ○ |
| Coating solvent | Water | Water | Water | Water |
| Inorganic particle diameter (μm) | 0.4 | 0.4 | 0.4 | 0.4 |
| First organic binder | SB | EVA | Acryl | Acryl |
| Second organic binder | Polyacryl polyether | Polyacryl polyether | Polyacryl polyether | Polyacryl polyether |
| Third organic binder | CMC | CMC | CMC | CMC |
| P/B ratio (first binder) | 20/1 | 20/1 | 20/1 | 20/1 |
| P/B ratio (second binder) | 15/1 | 15/1 | 15/1 | 15/1 |
| Coated surface | Both surfaces | Both surfaces | Both surfaces | Both surfaces |
| Coating separator thickness (μm) | 20 | 20 | 20 | 20 |
| Coating method | Dip | Dip | Dip | Dip |
| Line speed | 5 | 5 | 5 | 5 |
| Gurley (sec/100 cc) | 280 | 350 | 400 | 260 |
| Piercing strength (gf) | 230 | 200 | 180 | 530 |
| Adhesive strength (kgf) | 550 | 250 | 450 | 400 |
| Thermal contraction rate (150° C., 1 hr) | 3.5 | 20 | 2.0 | 2.7 |
| MD tensile strength (kgf/cm$^2$) | 1020 | 980 | 990 | 1530 |

TABLE 4

|  | Example 15 | Example 16 | Example 17 | Example 18 | Example 19 |
|---|---|---|---|---|---|
| Porous substrate | PP | PP | PE | PP | PP |

TABLE 4-continued

| | Example 15 | Example 16 | Example 17 | Example 18 | Example 19 |
|---|---|---|---|---|---|
| Substrate thickness (μm) | 14 | 14 | 14 | 14 | 14 |
| Corona treatment | ○ | ○ | ○ | ○ | ○ |
| Coating solvent | Water | Water | Water | Water | Water |
| Inorganic particle diameter (μm) | 0.4 | 0.4 | 0.4 | 0.7 | 1.1 |
| First organic binder | SB | SB | SB | SB | SB |
| Second organic binder | Polyacryl polyether | Polyacryl polyether | Polyacryl polyether | Polyacryl polyether | Polyacryl polyether |
| Third organic binder | CMC | CMC | CMC | CMC | CMC |
| P/B ratio (first binder) | 40/1 | 40/1 | 40/1 | 40/1 | 40/1 |
| P/B ratio (second binder) | 30/1 | 30/1 | 30/1 | 30/1 | 30/1 |
| Coated surface | Both surfaces | Single surface | Both surfaces | Both surfaces | Both surfaces |
| Coating separator thickness (μm) | 20 | 17 | 20 | 20 | 20 |
| Coating method | Die | Die | Dip | Dip | Dip |
| Gurley (sec/100 cc) | 230 | 220 | 230 | 280 | 320 |
| Piercing strength (gf) | 230 | 220 | 530 | 220 | 230 |
| Adhesive strength (kgf) | 320 | 340 | 450 | 360 | 350 |
| Thermal contraction rate (150° C., 1 hr) | 2.3 | 12 | 1.8 | 3.4 | 3.7 |
| MD tensile strength (kgf/cm²) | 1000 | 1010 | 1530 | 980 | 980 |

Comparative Example 1

A lithium secondary battery was prepared in the same manner as Example 1 except that there was used a polypropylene film (porosity of 45%) having a thickness of about 14 μm on which an organic/inorganic complex coating layer was not formed.

Comparative Example 2

A lithium secondary battery was prepared in the same manner as Example 1 except that there was used a polyethylene (PE) film (porosity of 48%) having a thickness of 14 μm on which an organic/inorganic complex coating layer was not formed.

Comparative Example 3

PVDF-HFP was added in an amount of 5 weight % to acetone and then dissolved at 40° C. for about 2 hours or more, thereby preparing a polymersolution. $Al_2O_3$ powder was added to this polymersolution such that a weight ratio of $Al_2O_3$ powder/PVDF-HFP (P/B ratio) could be 90/10. The resultant was subjected to a ball-milling for 3 hours or more to crush and disperse inorganic particles, thereby preparing inorganic slurry. A particle diameter of the $Al_2O_3$ in the slurry after crushing can be controlled depending on a particle diameter of beads used for the ball-mill and a time for the ball-mill. In Comparative Example 3, the slurry was prepared by crushing the inorganic particles to have an average particle size of 0.4 μm. As a porous substrate, a corona-treated polypropylene film (porosity of 45%) having a thickness of 14 μm was used, and a coating separator (PVDF/$Al_2O_3$) having a thickness of μm was finally prepared by a dip-coating method. A lithium secondary battery was prepared using the prepared organic/inorganic complex coating porous separator in the same manner as Example 1.

As a result, the prepared coating separator exhibited air permeability of 300 sec/100 cc and a thermal contraction rate of 10%, which were decreased as compared with Comparative Example 1.

Comparative Example 4

An organic/inorganic complex coating porous separator and a lithium secondary battery including the same were prepared in the same manner as Example 2 except that a second organic binder was not used.

As a result, the prepared coating separator exhibited air permeability of 520 sec/100 cc, which was decreased as compared with Example 2, and a thermal contraction rate of 19%, which was increased as compared with Example 2.

Comparative Example 5

An organic/inorganic complex coating porous separator and a lithium secondary battery including the same were prepared in the same manner as Example 2 except that as a third organic binder, polymethyl-methacrylate (PMMA) was used instead of carboxyl methyl cellulose (CMC).

As a result, the prepared coating separator exhibited air permeability of 580 sec/100 cc, which was decreased as compared with Example 2, and a thermal contraction rate of 25%, which was increased as compared with Example 2.

Comparative Example 6

An organic/inorganic complex coating porous separator and a lithium secondary battery including the same were prepared in the same manner as Example 2 except that a first organic binder and a second organic binder were not used, but only carboxyl methyl cellulose (CMC) was used as a third organic binder.

As a result, the prepared coating separator exhibited air permeability of 230 sec/100 cc, which was equivalent to that of Example 2, but an adhesive strength was decreased and a thermal contraction rate was increased.

Comparative Example 7

An organic/inorganic complex coating porous separator and a lithium secondary battery including the same were prepared in the same manner as Example 2 except that that a mixing ratio of $Al_2O_3$ powder and a first organic binder (SBL emulsion) was changed to $Al_2O_3$ powder/SBL=1/1 (weight ratio) instead of $Al_2O_3$ powder/SBL=40/1 (weight ratio).

As a result, the prepared coating separator exhibited air permeability of 1700 sec/100 cc, which was greatly decreased as compared with Example 2, and a thermal contraction rate of 12%, which was increased as compared with Example 2.

Comparative Example 8

An organic/inorganic complex coating porous separator and a lithium secondary battery including the same were prepared in the same manner as Example 2 except that that a mixing ratio of $Al_2O_3$ powder and a first organic binder (SBL emulsion) was changed to $Al_2O_3$ powder/SBL=150/1 (weight ratio) instead of $Al_2O_3$ powder/SBL=40/1 (weight ratio).

As a result, the prepared coating separator exhibited an adhesive strength of 30 kgf, which was decreased as compared with Example 2, and a thermal contraction rate of 22%, which was increased as compared with Example 2.

Comparative Example 9

An organic/inorganic complex coating porous separator and a lithium secondary battery including the same were prepared in the same manner as Example 2 except that that a mixing ratio of $Al_2O_3$ powder and a polyacryl polyether copolymer was changed to $Al_2O_3$ powder/polyacryl polyether copolymer=1/1 (weight ratio) instead of $Al_2O_3$ powder/polyacryl polyether copolymer=15/1 (weight ratio).

As a result, the prepared coating separator exhibited air permeability of 1500 sec/100 cc, which was greatly decreased as compared with Example 2, and a thermal contraction rate of 10%, which was increased as compared with Example 2.

Comparative Example 10

An organic/inorganic complex coating porous separator and a lithium secondary battery including the same were prepared in the same manner as Example 2 except that a mixing ratio of $Al_2O_3$ powder and a polyacryl polyether copolymer was changed to $Al_2O_3$ powder/polyacryl polyether copolymer=250/1 (weight ratio) instead of $Al_2O_3$ powder/polyacryl polyether copolymer=15/1 (weight ratio).

As a result, the prepared coating separator exhibited air permeability of 510 sec/100 cc, which was decreased as compared with Example 2, and a thermal contraction rate of 17%, which was increased as compared with Example 2.

The compositions and property measurement results of the separators prepared in Comparative Examples 1 to 10 were as illustrated in the following Tables 5 and 6.

TABLE 5

| | Comp. Example 1 | Comp. Example 2 | Comp. Example 3 | Comp. Example 4 | Comp. Example 5 |
|---|---|---|---|---|---|
| Porous substrate | PP | PE | PP | PP | PP |
| Substrate thickness (μm) | 14 | 14 | 14 | 14 | 14 |
| Corona treatment | — | — | ○ | ○ | ○ |
| Coating solvent | — | — | Acetone | Water | Water |
| Inorganic particle diameter (μm) | — | — | 0.4 | 0.4 | 0.4 |
| First organic binder | — | — | PVDF-HFP | SB | SB |
| Second organic binder | — | — | — | — | — |
| Third organic binder | — | — | — | CMC | PMMA |
| P/B ratio (first binder) | — | — | 9/1 | 40/1 | 40/1 |
| P/B ratio (second binder) | — | — | — | — | — |
| Coated surface | — | — | Both surfaces | Both surfaces | Both surfaces |
| Coating separator thickness (μm) | 14 | 14 | 20 | 20 | 20 |
| Coating method | — | — | Dip | Dip | Dip |
| Gurley (sec/100 cc) | 210 | 230 | 300 | 520 | 580 |
| Piercing strength (gf) | 230 | 530 | 230 | 240 | 220 |
| Adhesive strength (kgf) | — | — | 100 | 220 | 250 |
| Thermal contraction rate (150° C., 1 hr) | 35 | 50 | 10 | 19 | 25 |
| MD tensile strength (kgf/cm²) | 1000 | 1500 | 1000 | 1500 | 1500 |

TABLE 6

| | Comp. Example 6 | Comp. Example 7 | Comp. Example 8 | Comp. Example 9 | Comp. Example 10 |
|---|---|---|---|---|---|
| Porous substrate | PP | PP | PP | PP | PP |
| Substrate thickness (μm) | 14 | 14 | 14 | 14 | 14 |
| Corona treatment | ○ | ○ | ○ | ○ | ○ |
| Coating solvent | Water | Water | Water | Water | Water |
| Inorganic particle diameter (μm) | 0.4 | 0.4 | 0.4 | 0.4 | 0.4 |
| First organic binder | — | SB | SB | SB | SB |
| Second organic binder | — | Polyacryl polyether | Polyacryl polyether | Polyacryl polyether | Polyacryl polyether |

TABLE 6-continued

| | Comp. Example 6 | Comp. Example 7 | Comp. Example 8 | Comp. Example 9 | Comp. Example 10 |
|---|---|---|---|---|---|
| Third organic binder | CMC | CMC | CMC | CMC | CMC |
| P/B ratio (first binder) | — | 1/1 | 150/1 | 40/1 | 40/1 |
| P/B ratio (second binder) | — | 15/1 | 15/1 | 1/1 | 250/1 |
| Coated surface | Both surfaces | Both surfaces | Both surfaces | Both surfaces | Both surfaces |
| Coating separator thickness (μm) | 20 | 20 | 20 | 20 | 20 |
| Coating method | Dip | Dip | Dip | Dip | Dip |
| Gurley (sec/100 cc) | 230 | 1700 | 220 | 1500 | 510 |
| Piercing strength (gf) | 240 | 240 | 220 | 230 | 220 |
| Adhesive strength (kgf) | 120 | 650 | 30 | 630 | 230 |
| Thermal contraction rate (150° C., 1 hr) | 32 | 12 | 22 | 10 | 17 |
| MD tensile strength (kgf/cm$^2$) | 1500 | 1050 | 1500 | 1500 | 1500 |

Experimental Examples 1 to 4

Experimental Example 1: Surface Analysis of Organic/Inorganic Complex Coating Porous Separator In order to observe surfaces of an organic/inorganic complex coating porous separator prepared according to the present invention, the following experiment was carried out. As a sample, there was used an organic/inorganic complex coating porous separator of Example 1 in which a coating slurry containing inorganic particles, an emulsion and a water-soluble polymer was coated on both surfaces of a polypropylene film.

Figure 1:
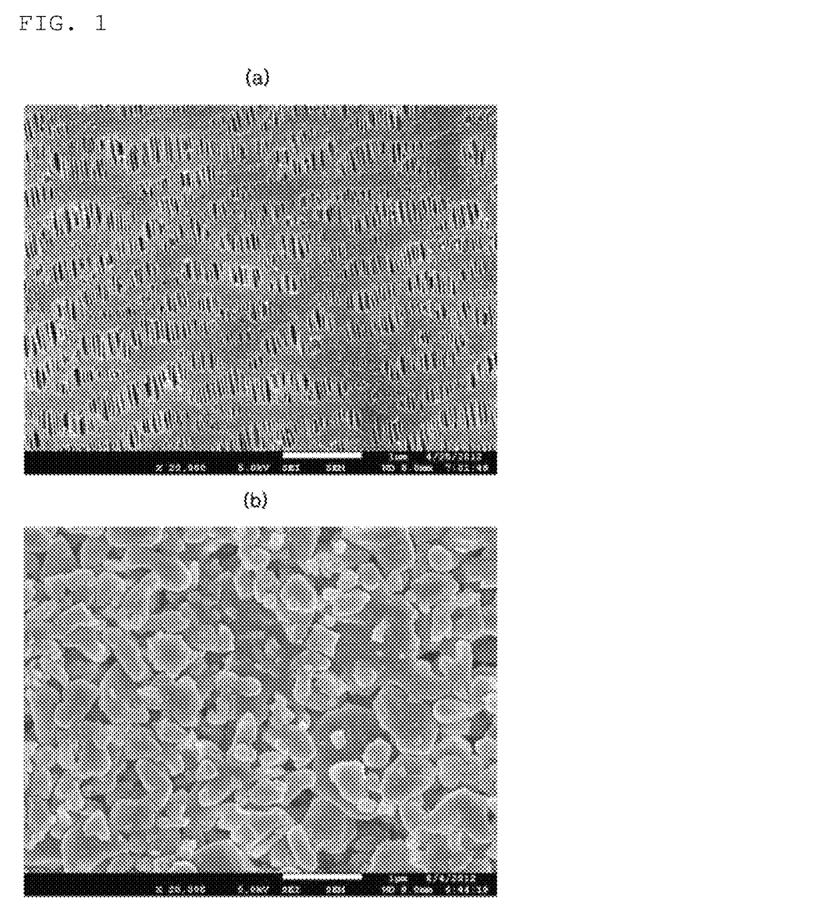

As a result of observation on the surface with a Scanning Electron Microscope (SEM), as illustrated in FIG. 1, it can be seen that in the organic/inorganic complex coating porous separator of the present invention, not only the separator substrate before coating (FIG. 1a) but also the organic/inorganic complex coating layers on both surfaces of the separator after coating (FIG. 1b) have a uniform pore structure.

Experimental Example 2: Thermal Contraction Analysis of Organic/Inorganic Complex Coating Porous Separator In order to check a thermal contraction improvement effect of an organic/inorganic complex coating porous separator prepared according to the present invention, the following experiment was carried out.

Organic/inorganic complex coating porous separators of Example 1 to Example 13 were used as samples, and a polypropylene separator of Comparative Example 1 was used as a control.

Figure 2:
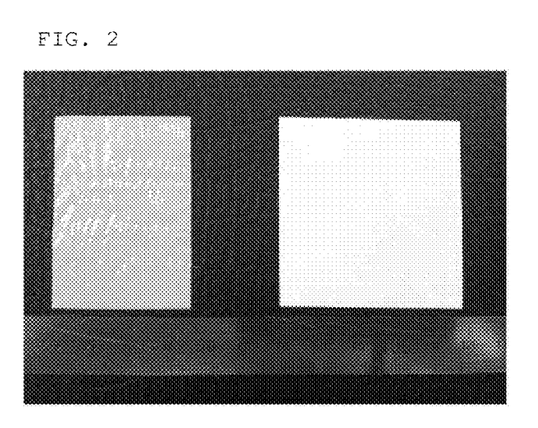
FIG. 2 is a photo illustrating a result of a thermal contraction experiment on separators, and illustrates the organic/inorganic complex coating porous separators prepared in Comparative Example 1 (polypropylene separator) and Example 2 after being left at 150° C. for 1 hour.

Each of the samples was left at a temperature of 150° C. for 1 hour and collected and observed. 1 hour after being left at a temperature of 150° C., the samples exhibited different contraction rates. In a representative example as illustrated in FIG. 2, the polypropylene separator of Comparative Example 1 as a control was contracted by about 30% at a high temperature and the pores were clogged, and, thus, a part of the film became transparent, whereas the organic/inorganic complex coating porous separator of Example 2 of the present invention was greatly decreased in thermal contraction (3% to 10%) and an external appearance of the film was also in good condition.

Experimental Example 3: Ionic Conductivity Evaluation of Organic/Inorganic Complex Coating Porous Separator In order to check a change in ionic conductivity caused by an organic/inorganic complex coating layer of an organic/inorganic complex coating porous separator prepared according to the present invention, the following experiment was carried out.

As samples, organic/inorganic complex coating porous separators of Examples were used, and as controls, a polypropylene separator of Comparative Example 1 and an oil-based coating separator of Comparative Example 3 were used.

Each of the samples was immersed in an ethylene carbonate/propylene carbonate/diethyl carbonate (EC/DMC/DEC=3:2:5)-based electrolyte in which 1.3 M lithium hexafluoro phosphate (LiPF$_6$) was dissolved. Then, ionic conductivity of each separator immersed in the electrolyte was measured using a VSP. In this experiment, a measurement temperature was 25° C.

Figure 3:
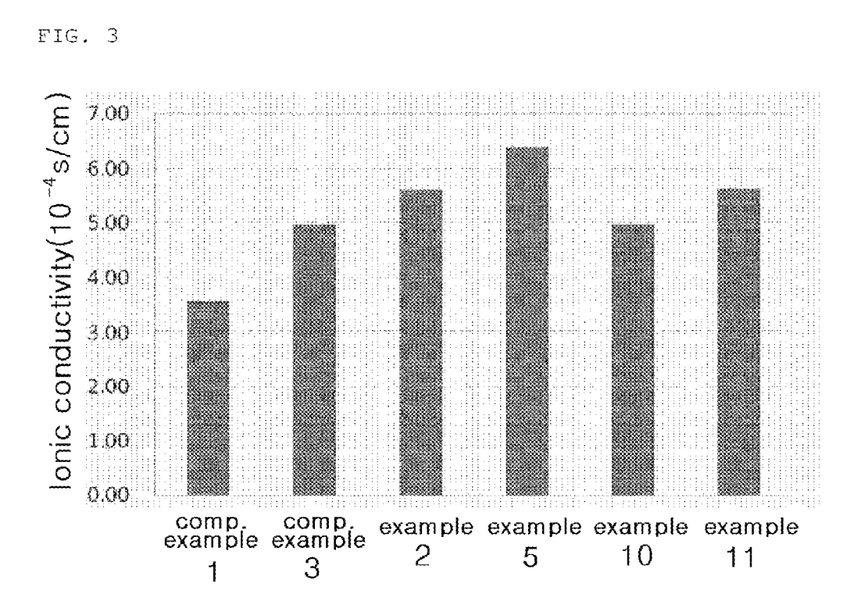
FIG. 3 is a graph illustrating a result of ionic conductivity measurement on separators, and illustrates a result of ionic conductivity measurement on the organic/inorganic complex coating porous separators prepared in Comparative Example 1, Comparative Example 3, Example 2, Example 5, Example 10, and Example 11.

As illustrated in FIG. 3, the organic/inorganic complex coating porous separator of the present invention exhibited a high ionic conductivity as compared with the polypropylene separator of Comparative Example 1 as a control and exhibited an equivalent ionic conductivity to that of the coating separator as an oil-based coating separator of Comparative Example 3.

Therefore, the organic/inorganic complex coating porous separator of the present invention was remarkably increased in ionic conductivity due to the coating layer, and it can be seen that ionic conductivity was more increased in water-based coating as compared with oil-based coating.

Experimental Example 4: Performance Evaluation of Lithium Secondary Battery

Figure 4:
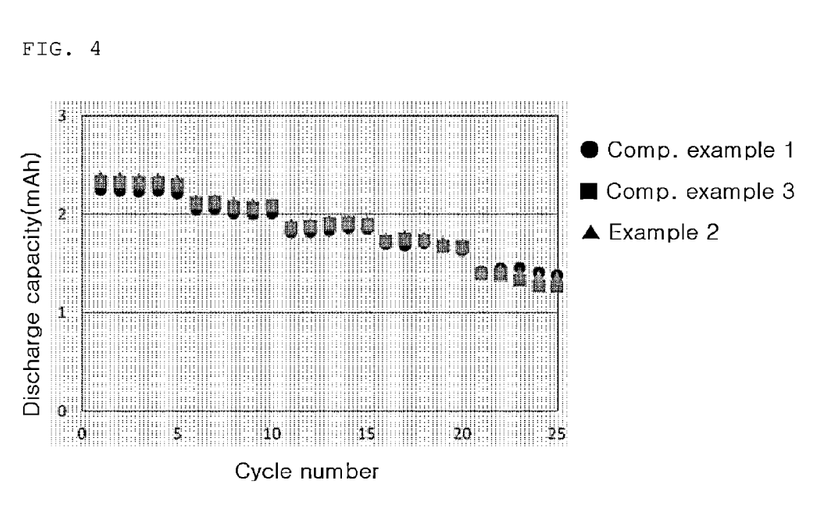
FIG. 4 is a graph illustrating a measurement result of a change in discharge capacity according to a C-rate of the organic/inorganic complex coating porous separators prepared in Comparative Example 1, Comparative Example 3, and Example 2.

In order to evaluate performance of a lithium secondary battery prepared according to Example 2 of the present invention, a capacity and a C-rate of each battery were measured. A cycle was carried out five times at a battery discharge speed of 0.2 C, 0.5 C, 1 C, 3 C, and 5 C, and discharge capacities thereof were schematized by C-rate characteristics as illustrated in FIG. 4.

As a result of the experiment, the lithium secondary battery including the water-based organic/inorganic complex coating porous separator of the present invention exhibited an excellent C-rate characteristic as compared with the batteries of Comparative Examples.

The invention claimed is:

1. A method for preparing a porous separator with an organic/inorganic complex coating, comprising the following steps:
   (1) a step of preparing an aqueous polymer solution by dissolving a second organic binder in water, wherein the second organic binder is one or more selected from a group consisting of phosphoric ester, phosphoric acryl-based copolymer, modified polyacrylate-based copolymer, modified polyacrylic acid-based copolymer, polyester polyamine amide-based copolymer, polycarboxylic acid-based copolymer, polyalkylol amino amide-based copolymer, polysiloxane polyacryl-based copolymer, polysiloxane polycarboxylic acid-based copolymer, polyalkoxylate-based copolymer, a copolymer of polyacryl and polyether, and metallic salts thereof;
   (2) a step of preparing a mixed solution by adding inorganic particles to the aqueous polymer solution obtained in the step (1) and mixing the resultant to disperse the inorganic particles therein, wherein a weight ratio of the inorganic particles:the second organic binder is 10:1 to 200:1;
   (3) a step of obtaining a coating solution by adding a first organic binder to the mixed solution of the step (2) and mixing the resultant, wherein the first organic binder is an emulsion or a suspension containing a water-insoluble polymer dispersed in water, and a weight ratio of the inorganic particles:the first organic binder is 4:1 to 140:1; and
   (4) a step of coating at least one region selected from a group consisting of at least one surface of a porous substrate and at least a part of pore portions in the porous substrate with the coating solution obtained in the step (3) and drying the resultant.

2. The method of claim 1, wherein in the step (1), a third organic binder is further dissolved in water.

3. The method of claim 2, wherein the third organic binder is a water-soluble polymer.

4. The method of claim 2, wherein the third organic binder is one or more selected from a group consisting of polyethylene oxide, carboxymethylcellulose, polyvinyl alcohol, polyvinyl pyrrolidone, starch, and an ionic polymer.

5. The method of claim 1, wherein the porous substrate is a film or non-woven fabric formed using one or more selected from a group consisting of high-density polyethylene, low-density polyethylene, linear low-density polyethylene, ultra high-molecular weight polyethylene, polypropylene, polyethylene terephthalate, polybutylene terephthalate, polyester, polyacetal, polyamide, polycarbonate, polyimide, polyetherether ketone, polyether sulfone, polyphenylene oxide, polyphenylene sulfide, and polyethylene naphthalene.

6. The method of claim 1, wherein a thickness of the porous substrate is 1 to 100 μm, a pore size is 0.01 to 50 μm, and a porosity is 10 to 90%.

7. The method of claim 1, wherein the inorganic particles include one or more selected from a group consisting of $SnO_2$, $BaTiO_2$, $Al_2O_3$, $CeO_2$, $SiO_2$, $TiO_2$, $Li_3PO_4$, NiO, ZnO, MgO, $Mg(OH)_2$, CaO, $ZrO_2$, $Y_2O_3$, and talc.

8. The method of claim 1, wherein the inorganic particles have an average particle size of 0.001 to 10 μm.

9. The method of claim 1, wherein the first organic binder is one or more selected from an emulsions or a suspension in which at least one polymer selected from a group consisting of polystyrene, styrene butadiene rubber, nitrile-based rubber, polyolefins, acryl-based polymer, acetate-based polymer, PVDF-based copolymer or PVD-based copolymer, ethylene-vinyl acetate-based polymer, polyvinyl butyral-based polymer, and polytetrafluoro ethylene-based polymer is dispersed in water.

10. The method of claim 1, wherein a weight ratio of the water:the inorganic particles is 95:5 to 20:80.

11. The method of claim 1, wherein a thickness of the porous separator is 0.1 to 50 μm, a pore size is 0.001 to 10 μm, and a porosity is 20 to 80%.

* * * * *